United States Patent [19]

Royer

[11] 4,290,074

[45] Sep. 15, 1981

[54] INK DROP GENERATOR FOR INK JET PRINTER

[75] Inventor: Gérard Royer, Saint-Denis, France

[73] Assignee: Compagnie Internationale pour l'Informatique CII-Honeywell Bull (Societe Anonyme), Paris, France

[21] Appl. No.: 96,527

[22] Filed: Nov. 21, 1979

[30] Foreign Application Priority Data

Dec. 29, 1978 [FR] France ................................ 78 36984

[51] Int. Cl.³ ................................ G01D 15/18

[52] U.S. Cl. ................................ 346/75; 346/140 R; 310/323; 310/325

[58] Field of Search ................................ 346/75, 140 IJ; 310/323, 325

[56] References Cited

U.S. PATENT DOCUMENTS

| | | | |
|---|---|---|---|
| 2,998,535 | 8/1961 | Church et al. | 310/325 |
| 3,328,610 | 6/1967 | Jacke et al. | 310/325 |
| 3,578,996 | 5/1971 | Balamuth | 310/325 |
| 3,772,538 | 11/1973 | Supitilov | 310/325 |
| 3,885,172 | 5/1975 | Miller | 310/325 |
| 3,900,162 | 8/1975 | Titus et al. | 346/75 X |
| 3,999,190 | 12/1976 | Brown et al. | 346/140 R |
| 4,005,435 | 1/1977 | Lundquist et al. | 346/75 X |
| 4,050,075 | 9/1977 | Hertz et al. | 346/140 R X |

*Primary Examiner*—George H. Miller, Jr.

*Attorney, Agent, or Firm*—Kerkam, Stowell, Kondracki & Clarke

[57] ABSTRACT

A drop generator for an ink jet printer comprises a mechanical vibration amplifier which is adapted, when set in vibration at one end, to cause at least one ink jet emitted from its other end to break up into drops. An electromechanical converter device is fitted at said one end to impart a vibratory movement to the amplifier when it is excited electrically. A compensating block is attached to the electromechanical converter device so as to set up in the latter a nodal vibration zone. A support member holds the generator in position in the printer and the part of the support member which is in contact with the generator is situated in the nodal zone.

20 Claims, 2 Drawing Figures

INK DROP GENERATOR FOR INK JET PRINTER

BACKGROUND OF THE INVENTION

1. Field of the Invention

The present invention relates to an ink drop generator for ink-jet printers.

2. Description of the Prior Art

Ink-jet printers which have been produced hitherto comprise at least one ink drop generator which projects a series of drops towards the surface of the paper on which the printing is to appear. The drops are compelled by deflecting means to follow predetermined trajectories in order to form on the paper groups of dots representing images of characters or graphic designs of any kind.

Printers of this kind are known in which the drop generator is formed by a mechanical vibration amplifier formed by a nozzle of small dimensions having one end of large cross-section and one end of small cross-section and pierced by a central passage extending between these two ends. The passage receiving ink under pressure at its opening is situated at the large cross-section end of the nozzle and terminates as the other end of the nozzle in a very small ink ejection opening. An electromechanical converter device, which is generally formed by a piezoelectric crystal member and which is fixed against the end of larger cross-section of the nozzle, imparts to the nozzle when excited electrically, a longitudinal vibration movement. This vibratory movement causes the ink jet emerging from the nozzle to break up into drops. The electromechanical converter device is also attached, by the face opposite that in contact with the larger cross-section end of the nozzle, to a carrier block which in turn is secured to the frame of the machine. An ink drop generator of this kind is described and illustrated in French patent No. 2,204,149.

With a drop generator of this nature, it is difficult to prevent the vibrations of the nozzle from being retransmitted on the one hand to the electromechanical converter device and on the other hand to the supporting block. As a result, the two electrodes which are associated with the nozzle and with the electromechanical converter device, respectively, are subjected to vibrations and such vibrations can cause disconnection of the electrical conductors. There is also a danger that the vibrations, even though of small amplitude, may be transmitted to the framework of the machine via the supporting block and upset the vibratory movement of adjacent drop generators. It may be possible to prevent these vibrations from being transmitted to the framework of the machine by inserting a damping member, such as a slab of rubber for example, between the frame and the supporting block; however, there is the added disadvantage of transverse vibrations in the generator which would cause changes in the direction of the ink jet emerging from the nozzle.

SUMMARY OF THE INVENTION

The present invention overcomes these disadvantages and provides an ink drop generator which, in operation, does not transmit unwanted vibrations to the support to which it is fixed. Nor does the ink drop generator of this invention transmit unwanted vibrations to the electrodes which are used to electrically excite the electromechanical converter device.

One object of the invention is to provide an ink drop generator for ink-jet printers, comprising a mechanical vibration amplifier having two ends which is adapted, when it is set in vibration at its first end, to cause at least one ink jet emitted from its second end to break up into drops at a point close to the said second end. An electromechanical converter device fitted at the first end imparts a vibratory movement to the amplifier when it is excited electrically. The ink drop generator of the invention is particularly characterized in that it also includes a compensating block attached to the electromechanical converter device so as to set up in the latter a nodal vibration zone. A support member holds the generator in position in the printer, and the part of the support member which is in contact with the generator is situated in the nodal zone.

BRIEF DESCRIPTION OF THE DRAWINGS

Other objects and advantage of the invention will become apparent from the following description, which is given by way of non-limiting example with reference to the accompanying drawings, in which.

DESCRIPTION OF THE PREFERRED EMBODIMENTS

Figure 1:
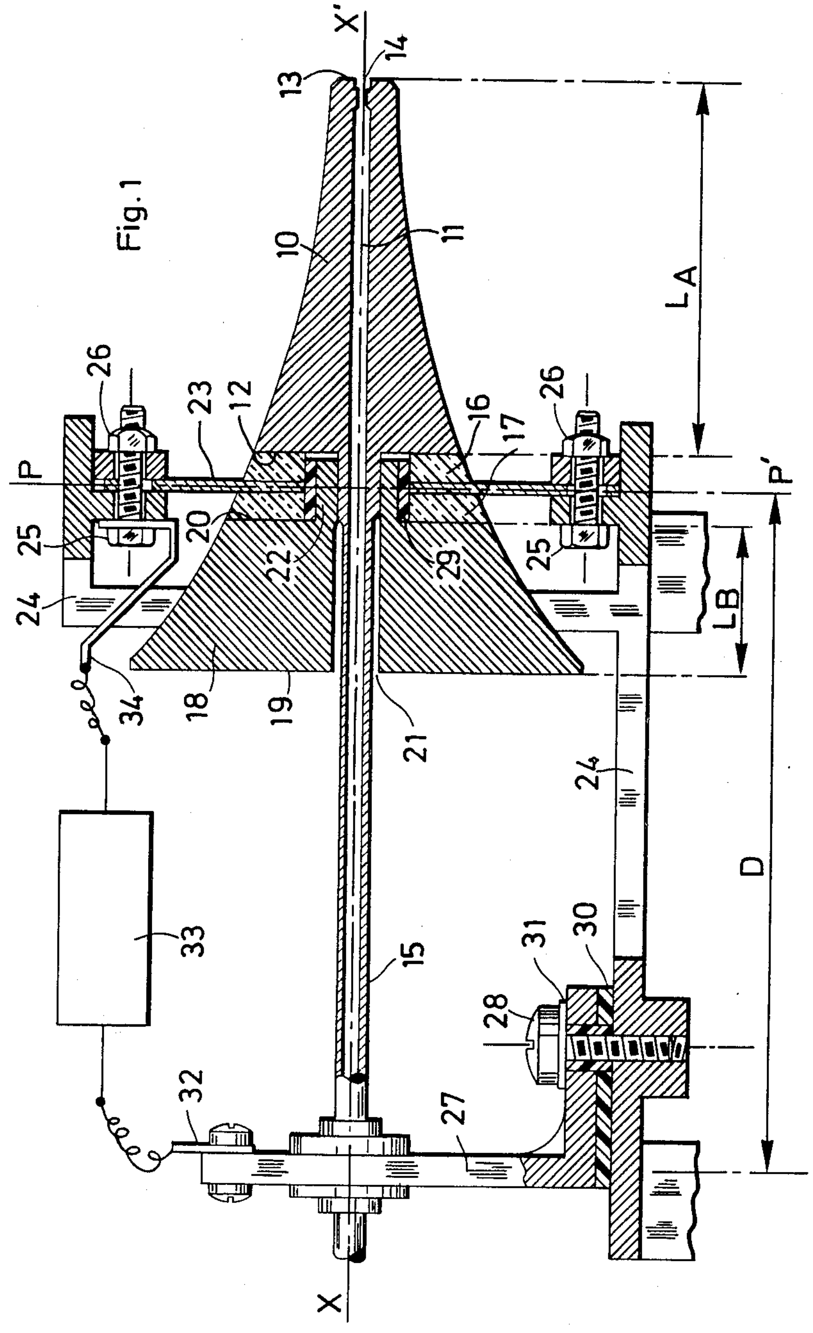
FIG. 1 is a partial, sectional view of one embodiment of an ink drop generator according to the invention.

The ink drop generator which is shown partly in cross-section in FIG. 1 comprises a mechanical vibration amplifier 10 having two ends 12 and 13 of which one, 13, is provided with an ink ejection opening 14. In the embodiment described, the mechanical amplifier 10 is in the form of a solid body having a longitudinal axis of symmetry XX'. The solid body is bounded at its ends 12 and 13 by two plane faces perpendicular to axis XX'. The area of the face situated at end 12 is greater than that of the face situated at end 13. In a particularly advantageous embodiment these two faces are circular and thus, when this is the case, the mechanical amplifier 10 is finally in the form of a volume which is bounded on the one hand by a surface of revolution about axis XX' and on the other hand by two circular faces perpendicular to the axis XX'. It should also be noted that, in the embodiment being described, the diameter of the mechanical amplifier 10 decreases regularly from end 12 to end 13. In the specific case illustrated in FIG. 1 the progressive decrease in diameter is exponential. It should, however, be appreciated that this particular shape for the amplifier is not a limitation of the invention and that the amplifier could also take other forms, such as, for example, the form of a truncated cone of axis XX'.

From FIG. 1 it will be seen that mechanical amplifier 10 has passing through it, along its axis XX', a central passage 11 which opens, at the end 13 of smaller cross-section into the ink ejection opening 14. On the side where the end 12 of larger cross-section is situated, passage 11 is connected to an ink supply tube 15. Tube 15 is in turn connected to an ink supply device (not shown), that allows ink fed in under pressure to the said device to make its way into the passage 11 and to emerge from the opening 14 in the form of an ink jet.

The ink drop generator shown in FIG. 1 also includes an electromechanical converter device which is firmly attached to the end 12 of larger cross-section of the amplifier 10. The electromechanical converter device is formed, in the embodiment being described, by two discs 16 and 17 of piezoelectric crystal. When the electromechanical converter device is excited, in a manner which will be described below, longitudinal mechanical vibrations, that is to say vibrations travelling along axis XX', are set up in the device and are applied to the end 12 of larger cross-section of the amplifier 10. Because of the shape of the amplifier 10, these longitudinal vibrations, as they are propagated towards the end 13 of smaller cross-section, increase in amplitude and at end 13 the amplitude of the vibrations has become such that the ink jet which emerges through opening 14 is divided near the opening into a series of identical drops synchronized with the vibrations.

The ink drop generator shown in FIG. 1 also includes a compensating block 18 mounted against the electromechanical converter device in such a way that this device is sandwiched between the amplifier 10 and the compensating block 18. In the embodiment being described, the shape of the compensating block 18 is derived by extrapolation from that of the amplifier 10 and is bounded at its ends 19 and 20, by two plane faces perpendicular to axis XX'. The area of the face situated at end 19 is greater than that of the face situated at end 20. The compensating block 18 is pierced by an opening 21, which extends in the direction of axis XX' between its two ends 19 and 20 and is coaxial with passage 11, so as to provide a passage for the ink inlet tube 15. The transverse dimensions of this opening 21 are larger than those of the tube 15, and the part of the tube situated normal to the compensating block never comes into contact with the block.

As can be seen in FIG. 1, the compensating block 18 is provided with a collar 22 on its face 20 of smaller diameter. Collar 22 passes through a central opening in the piezoelectric discs 16 and 17 and is firmly attached by suitable means such as screws or soldering or welding to the part of the tube 15 situated at right angles to the discs. The length of the collar is less than the total thickness of the discs 16 and 17 and so, when the component parts of the ink drop generator are assembled, the discs 16 and 17 can be held suitably clamped between the compensating block 18 and the amplifier 10.

As shown in FIG. 1, the piezoelectric discs 16 and 17 hold between them an attachment member 23 which is formed, in the embodiment being described, by a thin circular metallic plate. The plate includes at the center an opening for the tube 15 and the collar 22 which pass through. The plate is attached at its periphery to the frame 24 of the printing machine by means of bolts 25 and nuts 26. This plate thus enables the drop generator to be held in position in the machine.

In the embodiment illustrated in FIG. 1, the generator is also held in position in the machine by a second attachment member which is formed by an upright or frame member 27. Member 27 is fixed on the one hand to the frame 24 by means of attachment screws of which one, 28, is shown in FIG. 1, and on the other hand at a point along the tube 15 which will be defined below. It should however be noted, that this second frame member 27 is not essential to hold the ink generator in position in the machine, plate 23 being adequate.

It will be appreciated by those skilled in the art that the mechanical amplifier 10, the compensating block 18, the ink inlet tube 15 and the upright 27 are made of a material which is a conductor of electricity such, for example, as bronze or stainless steel. However, the assembly formed by these four items and joined together in the manner which has just been described, is electrically insulated from the metal plate 23. This insulation may be provided on the one hand by an insulating ring 29 which is mounted on the collar 22 so as to prevent the metal 23 from coming into contact with the collar, and on the other hand by an insulating pad 20 which is inserted between the upright 27 and the frame 24 of the machine. Insulating packings 31 are provided for each of the assembly screws 28 so as to prevent the screws from making unwanted electrical contact between the upright 27 and the frame 24.

It will also be noted in FIG. 1, that upright 27 is provided with a terminal 32 which is connected to one of the terminals of an electrical exciter source 33 and that the metal plate 23 is connected to a terminal 34. Terminal 34 is connected to the other terminal of the exciter source 33. Under these conditions, the source 33, which is formed by a conventional variable voltage generator of a known kind, applies a varying voltage across the two faces of each of the piezoelectric discs 16 and 17. This causes the discs to expand and contract in a direction parallel to axis XX'. As a result, the discs vibrate and transmit their vibrations on the one hand to end 12 of the amplifier 10 and on the other hand to end 20 of the compensating block 18. The length $L_A$ on the amplifier 10 and length $L_B$ of compensating block 18 are calculated as a function of the desired rhythm or frequency of drop formation and of the nature of the materials for the amplifier and the compensating block, in such a way as to set up a standing wave whose node lies on axis PP' (the nodal point) and whose antinodes are situated at the two ends of the generator. Because of the geometrical shape and nature of the materials, the maximum amplitude of the vibrations at end 13 of the amplifier is greater than that at end 19 of the compensating block.

Figure 2:
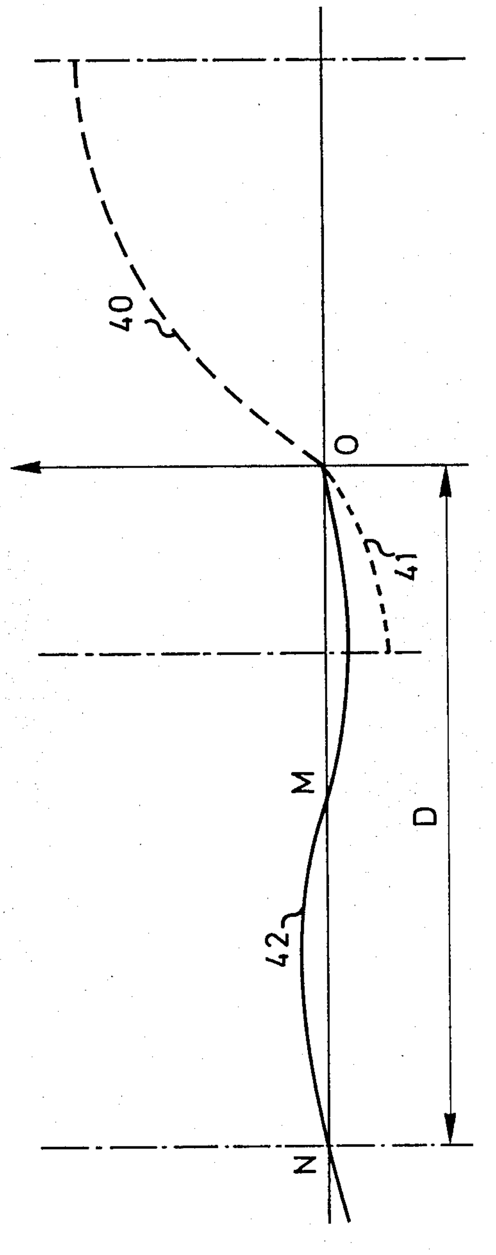
FIG. 2 is a diagram showing the change in the amplitude of vibration at various points in the drop generator shown in FIG. 1.

FIG. 2 illustrates the change in the amplitude of the vibrations in a direction parallel to axis XX' inside the amplifier and the compensating block. The changes of amplitude within the amplifier are represented by a curve 40 drawn as a broken line. That of the amplitude within the compensating block is represented by a chain line curve 41. Also shown in FIG. 2, by a solid line curve 42, is the change in the amplitude of the vibrations along the ink inlet tube 15. It can be appreciated that along tube 15 there is at least one point O where the amplitude of the vibrations is zero. This point O is situated in the center plane PP' which passes between the adjoining faces of discs 16 and 17. As a result, the zone contained between these two faces, that is to say the zone in which is situated the part of the thin plate 23 which is located between the two discs, is a nodal zone. The result is that the vibration to which the generator is subject, cannot be transmitted to the frame 24 of the machine.

FIG. 2 also shows that there are other nodal points along tube 15, such as M and N. The length of the tube is calculated in such a way that there is at least one such point. In the embodiment illustrated in FIG. 1, the point at which the upright 27 is fixed to the tube 15 is situated a distance D away from the center plane PP'. Distance D is chosen such that, as shown in FIG. 1, the point of attachment corresponds to the nodal point N. Although the maximum amplitude of the vibrations which are propagated along the tube 15 is relatively small, as can be seen in FIG. 2, this arrangement makes it possible for the upright 27 never to be subjected to an upsetting vibratory movement. As a result, electrical conductors which connect the terminals of the source 33 to terminals 32 and 34 are never subjected to vibrations and there is no danger of them becoming disconnected. In addition, in cases where the printing machine has a plurality of ink drop generators mounted next to one another, there is no danger of any generator setting up vibrations capable of upsetting the operation of neighbouring generators when it is itself operating.

The invention is not of course in any way restricted to the embodiment described and illustrated, and does in fact cover all means which form technical equivalents of the means described, as well as combinations of such means, if these are made within the true spirit and full scope of the invention as defined in the following claims.

I claim:

1. A drop generator for use in ink-jet printers, comprising a mechanical vibrations amplifier having two ends, one end of which is adapted to be vibrated and the other end adapted to have ink emitted therefrom, said amplifier including a passage extending between its two ends, and further including an ink supply tube connected to the said passage on the side of said one end of the amplifier, an electromechanical converter device connected at said one end of said amplifier for vibrating said one end to cause ink emitted from the other end to break up into drops at a point close to said other end, means for electrically exciting said converter device to impart a vibratory movement to said amplifier, a compensating block attached to the said converter device and arranged so as to set up in the said converter device a nodal vibration zone, said compensating block including an aperture for the passage of said ink supply tube, said tube having parts situated outside said nodal zone, the transverse dimensions of said aperture being greater than those of the tube such that the compensating block is maintained out of contact with said those parts of the tube situated outside said nodal zone, and attachment means for holding the drop generator in position on the ink jet printer, said attachment means including a first attachment member having a part in contact with said generator, said part being situated in said nodal vibration zone.

2. A drop generator according to claim 1, wherein the attachment means is a conductor of electricity and is connected to one of two terminals of an electrical exciter source.

3. A drop generator according to claim 1, wherein said generator has a longitudinal axis of symmetry and said mechanical amplifier and said compensating block each comprise a solid body defined by two plane faces perpendicular to the said axis and by a surface of revolution about said axis.

4. A drop generator according to claim 3, wherein the length of said supply tube is such that the tube contains at least one nodal point situated away from the nodal zone of said electromechanical converter device, and the attachment means further including a second attachment member secured to the said tube at said nodal point to enable it to be held in position in the printer.

5. A drop generator according to claim 4, further including insulating means arranged so as to electrically insulate the first and second attachment members from one another.

6. A drop generator according to claim 5, wherein said first attachment member is a material which is a conductor of electricity and is connected to said one of two terminals of said electrical exciter source, said second attachment member, the ink supply tube, the mechanical amplifier and the compensating block likewise being of a material which is a conductor of electricity, and said second attachment member being connected to the other terminal of the said exciter source.

7. An ink jet printing machine comprising at least one ink drop generator, means for connecting said generator to a source of ink, said drop generator comprising a mechanical vibrations amplifier having two ends, one end of which is adapted to be vibrated and the other end adapted to have ink emitted therefrom, said amplifier including a passage extending between its two ends, and further including an ink supply tube connected to the said passage on the side of said one end of the amplifier, an electromechanical converter device connected at said one end of said amplifier for vibrating said one end to cause ink emitted from the other end to break up into drops at a point close to said other end, means for electrically exciting said converter device to impart a vibratory movement to said amplifier, a compensating block attached to the said converter device and arranged so as to set up in the said converter device a nodal vibration zone, said compensating block including an aperture for the passage of said ink supply tube, said tube having parts situated outside said nodal zone, the transverse dimensions of said aperture being greater than those of the tube such that the compensating block is maintained out of contact with said those parts of the tube situated outside said nodal zone, and attachment means for holding the drop generator in position in the ink jet printer, said attachment means including a first attachment member having a part in contact with said generator, said part being situated in said nodal vibration zone.

8. An ink jet printer according to claim 7, wherein the attachment means is a conductor of electricity and is connected to one of two terminals of an electrical exciter source.

9. An ink jet printer according to claim 7, wherein said generator has a longitudinal axis of symmetry and said mechanical amplifier and said compensating block each comprise a solid body defined by two plane faces perpendicular to the said axis and by a surface of revolution about said axis.

10. An ink jet printer according to claim 9, wherein the length of said supply tube is such that the tube contains at least one nodal point situated away from the nodal zone of said electromechanical converter device and the attachment means further includes a second attachment member secured to the said tube at said nodal point to enable it to be held in position in the printer.

11. An ink jet printer according to claim 10, further including an insulating means arranged so as to electrically insulate the first and second attachment members from one another.

12. An ink jet printer according to claim 11, wherein said first attachment member is of a material which is a conductor of electricity and is connected to said one of the two terminals of said electrical exciter source, said second attachment member, the ink supply tube, the mechanical amplifier and the compensating block likewise being of a material which is a conductor of electricity, and said second attachment member being connected to the other terminal of the said exciter source.

13. A drop generator for use in ink jet printers, comprising a support member made of a thin metallic plate, a pair of electromechanical converter elements mounted one on each side of said plate, a mechanical vibration amplifier having two opposite ends of which one of said opposite ends is mounted on one of said converter elements, said amplifier including a passage extending between its two opposite ends and forming at the other end of said amplifier at least one opening adapted to have ink emitted therefrom, an ink supply tube passing through an aperture in said metallic plate and said converter elements and connected to the said passage on the side of said one end of the amplifier, means for electrically exciting said converter elements to impart a vibratory movement to said amplifier and to cause ink emitted from said opening to break up into drops at a point close to said opening, and a compensating block mounted on the other of said converter elements and arranged so as to set up in said metallic plate a nodal vibration zone, said compensating block including an aperture for the passage of said ink supply tube, said tube having parts situated outside said nodal zone, the transverse dimensions of the aperture of said block being greater than those of the tube such that the compensating block is maintained out of contact with those parts of the tube situated outside said nodal zone.

14. A drop generator according to claim 13 wherein said generator has a longitudinal axis of symmetry and said mechanical amplifier and said compensating block each comprise a solid body defined by two plane faces perpendicular to said axis and by a surface of revolution about said axis.

15. A drop generator according to claim 14 wherein the diameter of the mechanical amplifier decreases regularly from said end mounted on said one of said converter elements to said other end.

16. A drop generator according to claim 14 wherein the diameter of the mechanical amplifier decreases exponentially from said one end mounted on said one of said converter elements to said other end.

17. A drop generator according to claims 15 or 16 wherein said compensating block has a decreasing diameter between its plane faces and its shape is derived by extrapolating from the surface shape of said amplifier.

18. A drop generator according to claim 15, wherein the length of said supply tube is such that the tube contains at least one nodal point situated away from the nodal zone of said electromechanical converter device, and the attachement means is a conductor of electricity connected to one of two terminals of an electrical exciter source and further includes a second attachment member secured to the said tube at said nodal point to enable it to be held in position in the printer.

19. A drop generator according to claim 18, further including insulating means arranged so as to electrically insulate the first and second attachment members from one another.

20. A drop generator according to claim 19, wherein said first attachment member is a material which is a conductor of electricity and is connected to said one of two terminals of said electrical exciter source, said second attachment member, the ink supply tube, the mechanical amplifier and the compensating block likewise being of a material which is a conductor of electricity, and said second attachment member being connected to the other terminal of the said exciter source.

* * * * *